United States Patent [19]

Vaubel et al.

[11] Patent Number: 4,664,726
[45] Date of Patent: May 12, 1987

[54] STEEL ALLOY FOR STORAGE TUBES

[75] Inventors: Gert Vaubel, Warburg-Welda; Rolf Rathert, Rödinghausen, both of Fed. Rep. of Germany

[73] Assignee: Benteler-Werke Aktiengesellschaft, Paderborn, Fed. Rep. of Germany

[21] Appl. No.: 801,614

[22] Filed: Nov. 25, 1985

[30] Foreign Application Priority Data

Jan. 4, 1985 [DE] Fed. Rep. of Germany ....... 3500108

[51] Int. Cl.$^4$ ............................................. C22C 38/22
[52] U.S. Cl. .................................... 148/328; 148/334; 420/105
[58] Field of Search ................. 148/12 B, 12 F, 12.3, 148/36; 75/124 R, 124 B, 126 C

[56] References Cited

U.S. PATENT DOCUMENTS 3,600,161  7/1966  Inouye et al. ......................... 75/124

FOREIGN PATENT DOCUMENTS 54-40224   3/1979  Japan ..................................... 148/36
58-212847 12/1983  Japan ..................................... 148/36

*Primary Examiner*—L. Dewayne Rutledge
*Assistant Examiner*—Deborah Yee
*Attorney, Agent, or Firm*—Michael J. Striker

[57] ABSTRACT

A steel alloy for use as a material for storage tubes adapted to receive pressed objects of metal powder, which can store hydrogen and release the same, is of the composition comprised of 0.14 to 0.18 weight percent of carbon material 0.15 to 0.3 weight percent of silicon, maximum 0.025 weight percent of phosphorus, maximum 0.025 weight percent of sulfur, from 1.9 to 2.1 weight percent of chrome, from 0.45 to 0.60 weight percent of molybdenum, at least 0.015 to 0.030 weight percent of aluminum, and iron.

2 Claims, No Drawings

STEEL ALLOY FOR STORAGE TUBES

BACKGROUND OF THE INVENTION

The present invention relates to a steel alloy which is used for storage tubes.

The storage tubes have been used for mounting powdered metal pressed objects or briquettes utilized for storing hydrogen which can then be removed from them.

Storage tubes for the above mentioned use have been always in high demand.

Powdered metal pressed objects or briquettes used as hydrogen storage elements have been subjected during the initial loading with hydrogen to considerable volume expansion. Inasmuch as it has been known that desired qualities of the hydrogen storage element have been decreased with decrease in the thickness of the storage elements efforts have been made to maintain the volume expansion during the initial loading with hydrogen as little as possible. In practice this means that the inner and outer dimensions of the storage tubes should be selected in accordance with outer dimensions of powdered metal briquettes to be held by the tubes. During the first loading of the powdered metal briquettes the storage tubes must be prevented from a further volume expansion; this means that the storage tubes must be strong enough to take up forces occurring in powdered metal briquettes and causing the aforementioned volume expansion.

Since the loading of powdered metal briquettes with hydrogen takes place with a relatively high heat development in the temperature range of about 200° C. or higher the output at the material of such storage tubes is set in accordance with high elastic limits, also with the temperatures within the above mentioned range.

Storage tubes known in the art are subject to the same requirements as those set for pressure gas containers. This means that materials for storage tubes must have in addition to the above given temperature range, a rupture expansion of at least 16%.

Thus the basic requirement is that storage tubes must be relatively thin and be efficient for hydride storage with the smallest weight so that costs of such tubes be as little as possible.

It is of course understood that materials for such storage tubes must be hydrogen-resistant.

Materials utilized up till now for storage tubes have been not satisfactory.

Austenitic Chrome-Nickel steels used up till now have insignificant rigidity and are also expensive.

Nickel alloys have been used for storage tubes; the treatment of such alloys has been however problematic and they have been also expensive.

Aluminum alloys utilized for storage tubes have a little temperature resistance.

SUMMARY OF THE INVENTION

It is an object of the present invention to offer a better steel alloy for use for storage tubes.

It is another object of the invention to provide a steel alloy for a storage tube, which would meet all the requirements in a practical manner.

These and other objects of the invention are attained by a steel alloy composition composed of 0.14 to 0.18 weight percent of carbon material 0.15 to 0.3 weight percent of silicon, maximum 0.025 weight percent of phosphorus, maximum 0.025 weight percent of sulfur, from 1.9 to 2.1 weight percent of chrome, from 0.45 to 0.60 weight percent of molybdenum, at least 0.015 to 0.030 weight percent of aluminum, and iron, said composition being heat-treated and utilized as a material for storage tubes for receiving pressed objects of metal powder, which objects can store hydrogen and release the same.

Said composition may be tempered in accordance with a hardening process at the temperatures between 430° C. and 700° C.

DETAILED DESCRIPTION OF THE PREFERRED EMBODIMENTS

According to the invention, a steel alloy composition which comprises 0.14 to 0.18 weight percent of carbon material 0.15 to 0.3 weight percent of silicon, maximum 0.025 weight percent of phosphorus, maximum 0.025 weight percent of sulfur, from 1.9 to 2.1 weight percent of chromium, from 0.45 to 0.60 weight percent of molybdenum, at least 0.015 to 0.030 weight percent of aluminum, and iron is heat-treated and utilized as a material for storage tubes for receiving pressed objects of metal powder, which objects can store hydrogen and release the same.

The chief advantage of the present invention resides in that the proposed steel alloy composition has, also at the temperatures in the range of 200° C., higher elastic limits than those of conventional materials utilized for the same purpose. The proposed steel alloy is easy to treat and is not very expensive as compared to those known in the art.

It is particularly advantageous to harden the alloy by tempering the same at the temperatures between 430° C. and 700° C.

Although the elastic limits are somewhat reduced due to tempering of the steel alloy of the present invention, they are still much higher than the elastic limits of conventional steel alloys applied as storage tube material. A further advantage of the use of the proposed steel alloy composition is that rupture elasticity can be enhanced by the tempering process. This rupture elasticity at the above mentioned temperatures for example 200° C., can be at least 16%.

The storage tubes made in accordance with the invention fulfill all the requirements of pressure gas containers. These storage tubes are inexpensive and easy to make.

It will be understood that each of the elements described above, or two or more together, may also find a useful application in other types of steel alloys differing from the types described above.

While the invention has been illustrated and described as embodied in a steel alloy, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims;
We claim:

1. A steel alloy composition which is particularly useful for storage tubes for receiving objects pressed of metal powder and utilized for storing hydrogen and releasing the same, wherein the elements present in said alloy composition consist of 0.14 to 0.18 weight percent of carbon, 0.15 to 0.3 weight percent of silicon, maximum 0.025 weight percent of phosphorus, maximum 0.025 weight percent of sulfur, from 1.9 to 2.1 weight percent of chromium, from 0.45 to 0.60 weight percent of molybdenum, at least 0.015 to 0.030 weight percent of aluminum, and the balance iron, said composition having been heat-treated.

2. The alloy composition as defined in claim 1, wherein said composition has been tempered in accordance with a hardening process at the temperatures between 430° C. and 700° C.

* * * * *